Jan. 19, 1960

W. BUMP ET AL 2,921,444

PROCESSES FOR REMOVING SALTS AND OTHER
SOLUBLE SUBSTANCES FROM SEA WATER

Filed Oct. 12, 1956

2 Sheets-Sheet 1

Jan. 19, 1960　　　　　W. BUMP ET AL　　　　　2,921,444
PROCESSES FOR REMOVING SALTS AND OTHER
SOLUBLE SUBSTANCES FROM SEA WATER
Filed Oct. 12, 1956　　　　　　　　　　　　　2 Sheets-Sheet 2

2,921,444

PROCESSES FOR REMOVING SALTS AND OTHER SOLUBLE SUBSTANCES FROM SEA WATER

Wilson Bump, Kings Valley, and Willibald Weniger, Corvallis, Oreg.

Application October 12, 1956, Serial No. 615,608

11 Claims. (Cl. 62—58)

This invention relates to methods of and apparatus for separating brine from a liquid and has for an object the production of potable water from sea water or other sources of water characterized by the presence therein of salt and other materials which make it unsuitable for human consumption.

Our present application is a continuation-in-part of our application Serial No. 556,387, filed December 30, 1955, now abandoned.

In carrying out our invention, we have found that salts and other soluble substances in sea water and the like may be reduced by an amount sufficient to yield a resultant potable water by subjecting the frozen or partially frozen sea water to a pressure. We have found that upon the application of such a pressure, the salts and other soluble substances selectively separate from the frozen sea water in the form of a brine, leaving the remaining frozen mass sufficiently salt-free so that, after melting, the liquid is suitable for human consumption, irrigation, and industrial or other purposes.

Figure 1:
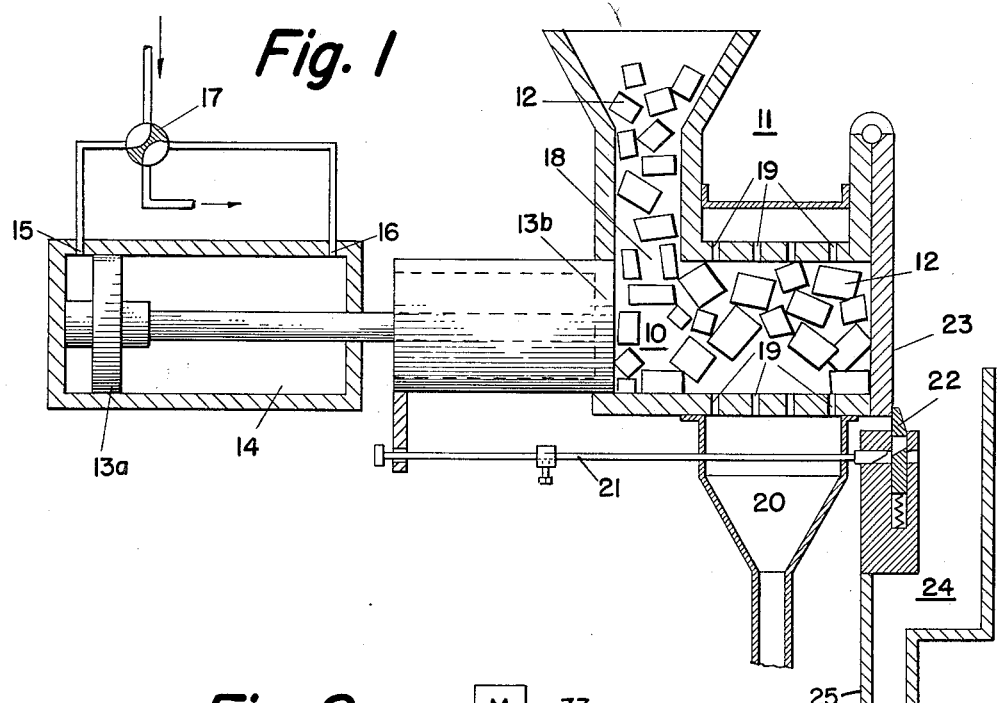
Figure 2:
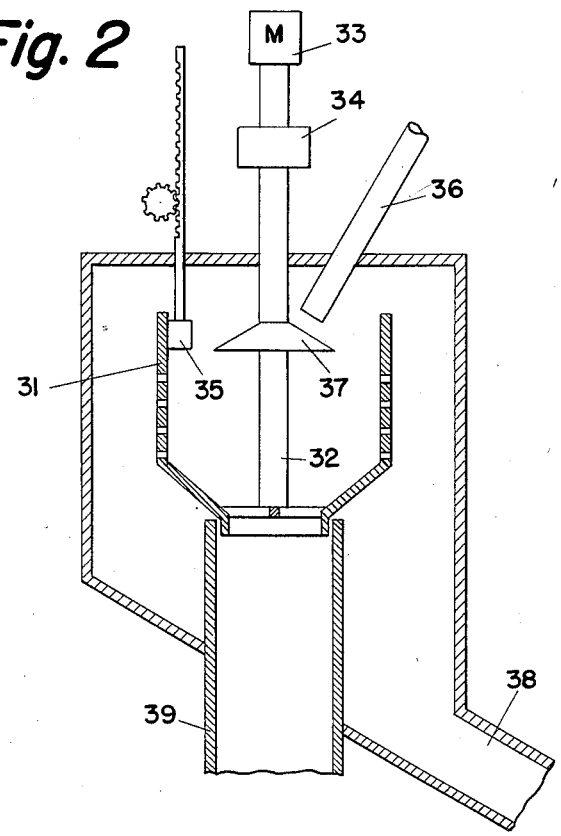
Figure 3:
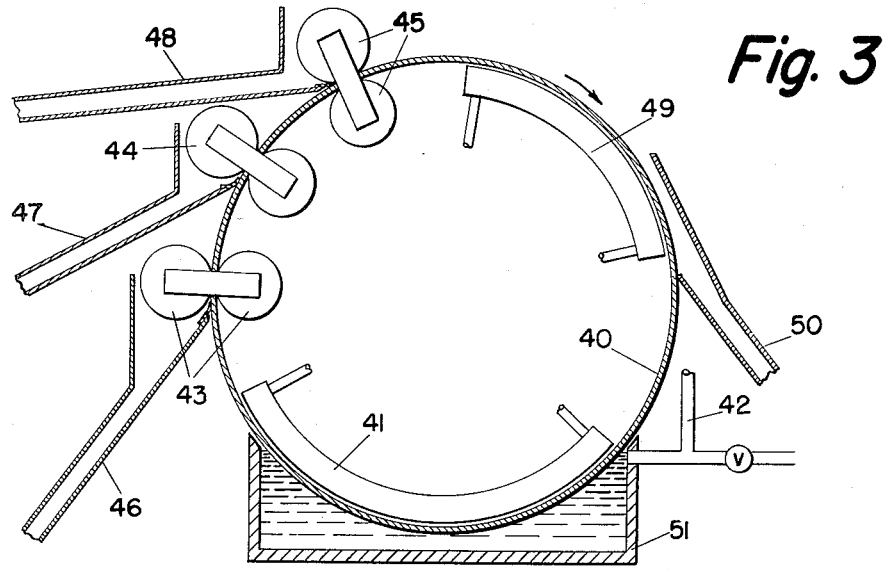
Figure 4:
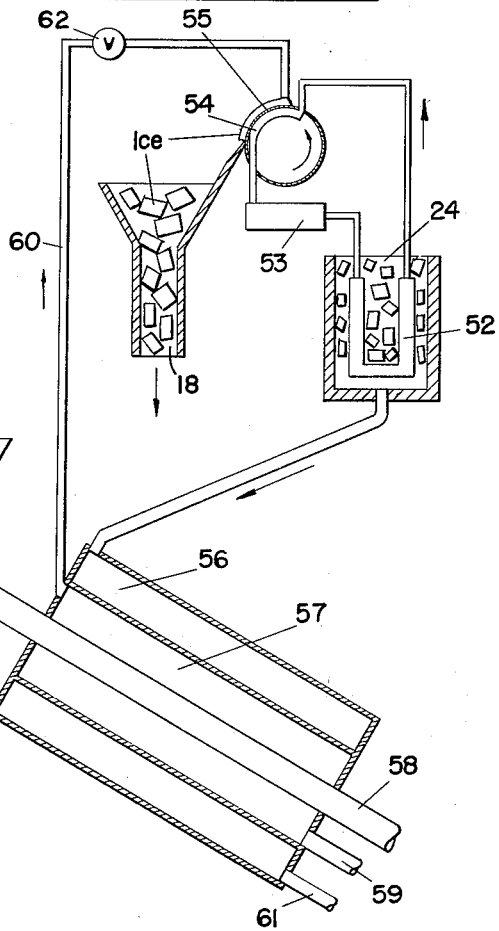

For further objects and advantages of the invention and for illustrations of some of the several different ways of carrying out the method, reference is to be had to the following description taken in conjunction with the accompanying drawings, in which:

Fig. 1 diagrammatically illustrates a press by means of which the method of the present invention may be practiced;

Fig. 2 diagrammatically illustrates a centrifuge for the practice of the invention;

Fig. 3 diagrammatically illustrates in the practice of the invention the use of one or more sets of pressure rollers; and Fig. 4 diagrammatically illustrates some heat interchanges that will decrease the cost of the product, purified water.

Referring to Fig. 1, a chamber 10 of a press 11 is filled with frozen sea water illustrated in the form of chunks of ice 12. The ice may be frozen in suitable masses, or be crushed or be furnished by a flake ice machine. Entrance of the ice from a hopper to the press is through port 18. In accordance with our invention, there is applied to the frozen sea water a pressure which is relatively high, of the order of upwardly of 1,000 pounds per square inch. Such a pressure may vary both above and below 1,000 pounds per square inch. Satisfactory results have been obtained over a fairly wide range of pressures and as high as 10,000 pounds per square inch.

The temperature of the ice or frozen sea water at the beginning of the process is not critical, but it is preferred that the temperature at the end of the process be at or near the melting point of pure water at the pressure applied. Though mechanical presses and other devices may be used for applying pressure to the ice, in Fig. 1 a press 11 of the hydraulic type has been illustrated in which a piston 13a is moved to and fro by a hydraulic fluid entering a cylinder 14 through ports 15 and 16 alternately as controlled by the valve 17. In press 11, a skirted piston 13b first closes port 18 through which ice has been entering chamber 10. As the motion of piston 13b continues, the ice is compressed and brine separated from the ice is formed through perforations 19 and caught in chamber 20. At a predetermined pressure, release rod 21 actuates catch 22 and allows trap door 23 to open. The piston 13b then expels the ice from chamber 10 into chamber 24. The ice in chamber 24 and also the brine in chamber 20 may be used in heat interchangers to cool untreated sea water preparatory to freezing same and/or in condensers for freezing. The water resulting from melting the ice in chamber 24 is, of course, the product sought. It flows to storage by way of pipe 25.

As the piston 13b engages the ice, frozen sea water, the pressure rises, and there is preferential melting of the lower freezing point material within the ice. Such lower freezing point material consists of brine, defined as a liquid having a high concentration of soluble materials of the character which lowers the freezing temperature and elevates the boiling temperature of a liquid solution thereof. As is well understood, this is particularly true of the salt present in sea water in high concentration. The application of the pressure produces not only accelerated melting of the portion of the ice containing the solid soluble material, but it also apparently induces a purifying action throughout the mass of the ice, and thus throughout the mass there is a selective withdrawal or melting away of liquid which carries with it nearly all of the dissolved material.

While the foregoing is presented in terms of results obtained, the entire mechanism involved may be of a more complex character than has been indicated. It appears that not only is there a selective melting of the ice, but also a deformation of ice crystals and a mechanical squeezing out of the brine. It has been determined that sea water, as for example, that from the Pacific ocean, if frozen and if pressure is applied to the frozen mass in the manner thus far described in Fig. 1, is purified. More particularly, with such sea water containing 3.65% of solids, based upon evaporation to dryness, and subjected at an initial temperature of 20° F. to a pressure of approximately 4,000 pounds per square inch, the resulting brine contained 21.0% of solids, and the water resulting from melting the final ice mass, 0.48% of solids. With the initial temperature at about 26° F., the same pressure produced a larger volume of brine containing 7.85% of solids and a smaller volume of water with 0.184% solids. Again, starting at about 26° F. and applying a pressure of 10,000 pounds per square inch, the brine contained 9.41% solids and the water 0.179% solids. In the above examples, the recovery of purified water was of the order of 50% of the salt-laden starting material.

In Fig. 2 there has been diagrammatically illustrated a suitable centrifuge for developing the required force or pressure upon the ice mass. A drum 31, rigidly fastened to its shaft 32 by means of spider elements (not shown) is rotated by an electric motor or other power source 33. A brake 34 is supplied to stop the drum when desired. A scraper 35 can be raised or lowered while the drum 31 is rotating. Sea ice, fragmented, enters through chute 36 and is redirected by the cone 37, rigidly attached to shaft 32. Due to the action of centrifugal force the more dense liquid component is separated from the solid component, leaves the rotating drum 31 through perforations in its curved surface, and is withdrawn to storage through pipe 38. Ice formed and re-formed within the drum 31 is scraped from its interior surface and recovered through pipe 39. It is to be understood that centrifuges of many different types may be utilized, the one described being illustrative.

In Fig. 3 we have illustrated a system by means of which the purification process may be carried out in a continuous manner. Sea water is frozen as a thin sheet on the exterior surface of a rotating stainless steel (or other) cylinder 40 by means of the evaporator 41 of a refrigeration machine. The sea water is supplied from a tank 51 below cylinder 40, contact with the lower surface of the cylinder being assured by sea water in the standpipe 42. The thin film of ice passes between one or more sets (three sets shown in diagram) of pressure rolls. If more than one set of rolls is used, they are at different temperatures; set 43 is, say, at 20° F.; set 44 at, say, 25° F.; and set 45 at, say, 28° F. At each set of rolls the brine released by the pressure is caught by suitable means and led away by pipes 46, 47 and 48. The remaining thin film of ice passes close to the condenser plates 49 of the refrigeration machine, is melted and removed from cylinder 40 by a suitable scraper and led to storage through pipe 50.

In Fig. 4 is illustrated diagrammatically a scheme of heat interchanges that will aid in reducing the cost of the purified water. The interchanges are drawn as applied to the process of Fig. 1 in which there is included apparatus for producing flake-ice. The described heat-exchange system may be applied equally well to the other processes we have described as well as to modifications thereof. As indicated, a refrigeration machine is incorporated in Fig. 4, but it may be replaced by other methods of procuring frozen sea water. Three of the items in the diagram bear the same numbers as in Fig. 1: 18 represents the passage through which frozen sea water enters chamber 10 of press 11; 20 is the chamber in which the brine from chamber 10 is caught; and 24 is the chamber into which the ice from chamber 10 is received after having been subjected to pressure.

The condenser 52 of the refrigeration machine is shown in chamber 24 surrounded by the frozen purified water. The ice in melting cools the refrigerant of the refrigeration machine after same issues from the compressor 53 of the refrigeration machine. The cooled refrigerant (liquid) passes into the evaporator 54 of the refrigeration machine and while evaporating and expanding, cools the metal drum of this machine below the freezing point of the sea water or brine.

The three concentric hollow cylinders 56, 57, 58 represent diagrammatically a heat exchanger that will precool sea water entering through pipe 59, by means of the cold purified water entering cylinder 56 from chamber 24, and also by means of the cold brine entering cylinder 58 from chamber 20. The cooled sea water flows through pipe 60 and is allowed to flow upon the cold outer surface of the metal drum 55, where it is frozen, scraped off, and received in a suitable container from which it passes through orifice 18 into the pressure cylinder. The warmed purified water is led through pipe 61 to storage.

It is to be understood that we have diagrammatically illustrated apparatus suitable for carrying out the invention and that well-known mechanical features of such apparatus will be included. For example, in the heat-exchange unit 56—58 suitable fins and the like will be provided to extend the heat-exchange surface area to assure maximum cooling of the sea water entering by way of pipe 59 and flowing by way of pipe 60 and valve 62 to the freezing surface of evaporator 54. Similarly, Fig. 3, the lower end of the pipe 50 which opens into a funnel includes a rigid scraping surface, whereas similar funnel ends of pipes 46, 47, and 48 have flexible end portions which can be displaced by the frozen layer of ice, but which will remain effective to take from the surface of the ice on the drum brine forced from the frozen ice mass.

It is to be understood that frozen sea water in the form of ice available in arctic and antarctic climates, or during winter in temperate zones, may be used directly, or suitable refrigeration may be applied anywhere, at any time, to provide the starting material for the practice of the invention. It is to be further understood that the apparatus described for the practice of the invention is to be taken as illustrative of the requirements of the invention in the application of physical pressure to initiate and accelerate the thawing and flow of solid-containing brine for the cleaning and purification of the ice mass, leaving as a desirable product, purified frozen water.

As a by-product, or in some cases as a principal product, the concentrated brine itself can serve as a starting material for salt recovery systems, since the solid content will be materially higher than in the starting material, sea water.

While apparatus of many kinds can be used in the practice of the present invention, certain additional information will be useful in adapting the invention to different applications. For example, the lower the initial temperature at which pressure is applied, the more concentrated the brine will be, but also the greater the cost of refrigeration; the more closely the initial temperature at which pressure is applied approaches the normal freezing temperature of pure water, the lower the salt content of the purified water, but also the lower the yield of purified water. For a reasonable yield of purified water, of from 25% to 50% of the original volume, apply pressure initially at a low temperature, say 20° F. or less, allow or cause the temperature to rise, apply pressure again or maintain the pressure, until the final application of pressure occurs at practically the freezing temperature of pure water at that pressure.

It should be noted that sea water does not have a definite freezing temperature and does not become completely solid until all the salts have been precipitated; ordinary sea ice is a mixture of ice and brine or ice and brine and salts. In the claims we shall refer to the frozen starting material as a frozen mass to encompass frozen sea water and other frozen liquids without limitation as to the extent of the freezing.

What is claimed is:
1. The method of purifying sea water which comprises rotating a drum with the lower portion thereof immersed in a body of sea water, removing heat from the immersed portion of the drum to form on the face of the drum a layer of frozen sea water, at a plurality of stations spaced along the periphery of the drum applying pressure to the frozen layer of sea water to produce flow from it of a plurality of streams of brine containing a high percentage of solids in solution, and thereafter melting the frozen residue for recapture of potable water.

2. The method of claim 1 in which said heat is withdrawn from said immersed portion of said drum by way of an evaporator of a refrigerating machine and wherein heat is applied to a second portion of the drum following the region in which said pressures are applied to said frozen layer by way of the condenser of the refrigerating machine.

3. The method of claim 1 in which a stream of sea water is supplied to a container at a rate to maintain a predetermined immersion level of the drum therein.

4. A system of purifying sea water which comprises a drum, an open vessel, means rotatably supporting said drum with the lower portion thereof extending into said vessel, means for supplying sea water to said vessel to maintain a predetermined level therein for immersion of a portion of the drum extending into said vessel, means for rotating said drum, heat-transfer means including an evaporator in heat-exchange relation with said drum along the region of immersion of said drum within said vessel for extraction of heat from the sea water to produce a frozen layer thereof on the face of said drum, a plurality of pressure rollers disposed at spaced stations along the travel path of said drum, means for applying pressure to the frozen layer of sea water on said drum to force therefrom streams of brine, collector means disposed adjacent the rollers and in contact with the frozen layer of sea water for withdrawing brine from further contact with the frozen layer of sea water as it is moved toward the rollers, said heat-transfer means including a condenser for applying heat to the frozen layer of sea water after its exit from the last of said rollers, and means for collecting as an end-product the substantially brine-free water comprising said frozen layer after its passage through the last of said rollers.

5. The method of purifying salt-bearing sea water which comprises cooling quantities of sea water to form a solid mass, applying pressure to said frozen mass of magnitude upwardly of 1,000 pounds per square inch, said pressure-applying step being performed in the absence of cooling for elevation of the temperature of said mass during said pressure-applying step to approximately that of pure water at the pressure applied to said frozen mass, separating from the frozen mass salt-containing liquid produced by said pressure applied to said frozen mass, and harvesting the remainder of said frozen mass as an end-product of water characterized by a salt content less than about 0.48% solid salt.

6. The method of claim 5 in which said frozen mass is rotated at a speed for developing by centrifugal force said pressure applied to said mass of magnitude upwardly of 1,000 pounds per square inch.

7. An apparatus for purifying salt-bearing sea water which comprises means for cooling a quantity of sea water to temperatures substantially below the freezing point thereof and of the order of 20° F. to form a solid mass, means for applying pressure to said frozen mass while at its low freezing temperature and for continuing the application of said pressure during rise of temperature of said mass to a temperature approximately that of the freezing temperature of pure water for separating from the frozen mass salt-containing liquid produced by said pressure applied to said frozen mass during said rise of temperature thereof, and means for melting the quantity of the frozen mass remaining at the end of said application of said pressure to obtain water as an end-product, said water being characterized by a salt content less than about 0.48% of solid salt and with a yield of water of at least 25% that of the original volume of sea water.

8. The apparatus of claim 7 in which said means for applying said pressure to said frozen mass comprises a centrifuge for rotating said mass to apply said pressure by centrifugal forces developed by rotation of said mass.

9. A system of purifying sea water which comprises a tank for a body of sea water, a drum mounted for horizontal rotation with the lower portion only thereof immersed in said body of sea water, refrigerating means disposed adjacent the periphery of the drum submerged in said body of sea water for freezing a layer of said sea water on the surface of said drum, a plurality of pressure-applying means spaced one from the other circumferentially of the drum and each including at least a pair of rollers one on each side of the drum for applying pressures of at least 1,000 pounds per square inch to the layer of ice formed on said drum to force from said ice streams of brine containing a high percentage of solids in solution, the temperature of said ice rising as it is carried by said drum in a direction away from said refrigerating means, the temperature of said ice rising to approximately that of purified water at the time it enters said last pressure-applying means, and means for harvesting from said drum the frozen residue after passage through said last pressure-applying means for recapture of potable water.

10. A system of purifying sea water which comprises refrigerating means including an evaporator for extraction of heat from sea water to produce a frozen mass, means for applying pressure to the frozen mass of sea water at a location removed from the evaporator while heat is being transferred to the frozen mass to raise its temperature to that of the freezing temperature of pure water, a flow channel for withdrawing as a liquid product the brine produced by said application of pressure to, and partial melting of, said frozen mass, means for collecting as a liquid product substantially brine-free water from the portion of said frozen mass remaining after said pressure applying operation, said refrigerating means including a condenser flow-connected to said evaporator, said condenser being disposed in heat transfer relation with at least a portion of said frozen mass, and heat exchange means for reducing the temperature of said sea water by cooling said sea water by one of said liquid products prior to conversion of said sea water into said frozen mass.

11. The system of claim 10, in which said heat exchange means includes flow connections for both of said liquid products of said system for flow thereof in countercurrent relation with a stream of said sea water prior to its arrival at said evaporator.

References Cited in the file of this patent

UNITED STATES PATENTS

| | | |
|---|---|---|
| 530,526 | Holden | Dec. 11, 1894 |
| 530,527 | Holden | Dec. 11, 1894 |
| 1,020,759 | Holden | Mar. 19, 1912 |
| 1,931,347 | Gay | Oct. 17, 1933 |
| 2,389,732 | Kellogg | Nov. 27, 1945 |
| 2,424,663 | Mantle | July 29, 1947 |
| 2,617,274 | Schmidt | Nov. 11, 1952 |
| 2,666,304 | Ahrel | Jan. 19, 1954 |
| 2,676,469 | Wenzelberger | Apr. 27, 1954 |
| 2,765,921 | Green | Oct. 9, 1956 |